United States Patent [19]

Wesselski et al.

[11] 4,174,408

[45] Nov. 13, 1979

[54] DRY POWDER MIX FOR FRYING BATTER

[76] Inventors: Fred A. Wesselski; Irving Moore, Jr., both of P.O. Box 28, Wharton, Tex. 77488

[21] Appl. No.: 832,652

[22] Filed: Sep. 12, 1977

[51] Int. Cl.² ............................................ A21D 10/04
[52] U.S. Cl. ..................................... 426/302; 426/555
[58] Field of Search ............... 426/555, 552, 554, 439, 426/302, 296

[56] References Cited

U.S. PATENT DOCUMENTS

| 2,623,825 | 12/1952 | Tressler et al. | 426/555 |
| 3,041,178 | 6/1962 | Marvin | 426/296 |
| 3,169,069 | 2/1965 | Hanson et al. | 426/291 |
| 3,235,385 | 2/1966 | Cull | 426/555 |

*Primary Examiner*—Raymond N. Jones
*Assistant Examiner*—Elizabeth A. Hatcher
*Attorney, Agent, or Firm*—Hubbard, Thurman, Turner, Tucker & Glaser

[57] ABSTRACT

A frying batter mixture which includes a farinaceous ingredient, dried buttermilk, dried cream and dehydrated eggs in selected amounts is disclosed which can be packaged complete and stored until ready for use at which time only water needs to be added to provide a good and tasty frying batter. The batter can be used to fry all kinds of food in a deep fry.

9 Claims, No Drawings

DRY POWDER MIX FOR FRYING BATTER

This invention relates to a mixture for batter for covering foods to be cooked, and in one of its aspects to such a batter for coating foods to be fried in a deep fry. In another aspect of the invention, it relates to a mixture for a batter mix which can be prepared in powder form and packaged and stored completely dry until use. In yet another aspect, this invention relates to an improved method for cooking foods wherein the foods are coated with a unique batter mix and then cooked.

Coating foods with a batter prior to cooking is a long established practice for sealing in the natural juices of food stuffs and for providing a tasty crust. The use of batters for deep-frying foods is almost universal, but the traditional ways of preparing the batter are time-consuming and bothersome and many times involve considerable mess. In restaurants, the preparation of batters can present considerable timing problems since wet batters normally cannot be prepared long in advance of when they are needed. Restaurants also have the problem of trying to guess in advance the quantities of the batter which will be needed for any particular meal. As a result of these problems, there has been ongoing research to develop frying batters which are mostly premixed and easily packaged and stored.

One batter mix is disclosed in U.S. Pat. No. 2,623,825 issued to Tressler and Breithaupt which involves first preparing an aqueous solution and then dehydrating that solution. The elaborate method shown in that patent for preparing the dehydrated puree extract costs a formidable expenditure of time and equipment. Additionally, there is the problem of storing the ingredients that are used for the puree. Apples and tomatoes, which are used in the puree, normally require refrigerated storage, and even then, have fairly short shelf life compared to dry ingredients. Furthermore, due to the nature of the elements in the puree, the mixture tends to become lumpy and less miscible after it has been stored. As a result, when foods are fried in the batter after it has been stored, the coating is less pliable and less sealant than that made from a batter which has not been stored.

Another approach to making dried batter mixes, that of adding puffing agents or buffering agents, is shown in U.S. Pat. No. 3,235,385 issued to Cull and U.S. Pat. No. 3,952,110 issued to Knight. The mixtures shown in these two patents include such items such as sodium bicarbonate, tetrasodium pyrophosphate, or other alkali phosphates. In addition, after dipping food items into the batter disclosed by Cull, one must then roll the foodstuffs in flour or meal before cooking, creating an extra step in the cooking process and normally an extra mess to be cleaned.

An object of this invention is to provide an improved dry batter mix which can be packaged and stored prior to use, and then mixed with a liquid for use, and which does not have the disadvantages of the prior art batter mixes described.

Another object of the present invention is to provide a batter which when added to a liquid, adheres to foodstuffs such as chicken, beef, pork, fish, shrimp, oysters, onion rings, potatoes and other foodstuffs, and does not pull away from the coated food during the breading, battering or frying.

Another object of this invention is to provide a batter made from the batter mix of this invention which forms a unitary shell around the foodstuffs substantially sealing in all the natural juices upon cooking.

Another object of the present invention is to provide a batter mix that produces a batter which will yield a tender, crisp crust of golden brown color with a minimum of coating.

Another object of the present invention is to provide a batter which may be frozen on foodstuffs without the necessity of immediate cooking, and can be handled without loss of its coating.

Yet another object of the present invention is to provide a batter mix that provides for a fast, simplified method of preparing food for deep fat frying for fast food restaurants.

Another object of the present invention is to provide a dry batter mix that can be stored indefinitely in its dry form without significant loss of texture.

Another object of the present invention is to provide a batter such as described which can be stored for more than a day without loss of effectiveness even after mixed with water.

Another object of the present invention is to provide such a batter that can be made without sifting by simply mixing the ingredients.

These and other objects, advantages, and features of this invention will be apparent from a full consideration of this specification and the appended claims.

The preferred form of dry batter mix of this invention includes selected amounts of (a) a farinaceous ingredient such as wheat, barley, corn, rice, rye and tapioca flours or meals, (b) dehydrated eggs, (c) dried buttermilk, and (d) dried cream. Seasonings such as salt and pepper can be added for flavoring. Essential ingredients of the mix are all natural products in dried form, and the dried buttermilk constitutes at least about 3%, by weight of the ingredients of the batter mix. In one embodiment of this invention, the dried buttermilk constitutes a far larger percentage by weight of the non-farinaceous ingredients than in other dry mixes. In this embodiment, the dried buttermilk constitutes at least about 40% of the weight of the non-farinaceous ingredients, and preferably less than 65% of the weight of the non-farinaceous ingredients. The lactic acid in the buttermilk thus lowers the pH of the food during cooking. This is believed to have a beneficial effect in helping to retain the natural juices of the food.

A batter mix according to this invention may consist essentially of the following proportions of dry ingredients:

| Ingredients | Percent By Weight of Four Primary Ingredients |
|---|---|
| Farinaceous Ingredient | From about 87 to about 95 |
| Dried Buttermilk | From about 3 to about 7 |
| Dried Cream | From about 1 to about 4 |
| Dehydrated Eggs | From about 1 to about 3 |

A batter mix according to this invention preferably consists essentially of the following proportions of dry ingredients:

| Ingredients | Percent By Weight of Four Primary Ingredients |
|---|---|
| Farinaceous Ingredient | From about 89 to about 94 |
| Dried Buttermilk | From about 3 to about 6 |
| Dried Cream | From about 1 to about 3 |

| Ingredients | Percent By Weight of Four Primary Ingredients |
|---|---|
| Dehydrated Eggs | From about 1 to about 3 |

"Consists essentially of" is used here to mean that other ingredients can be added to the ingredients listed so long as the additional ingredients do not substantially alter the properties of the mix. For instance, baking powder, spices, seasoning agents, color agents, etc. could be added to each embodiment of this invention without departing from the scope of this invention.

Referring now to the specific preferred embodiments of this invention, it can be further illustrated by the following examples of dry batter mixes made in accordance with this invention, it being understood that many examples can be given of a suitable dry mix batter when the ingredients are mixed in the proportions stated previously, being the range of ingredients suitable for this invention.

A preferred embodiment of a dry batter mix according to this invention consists of the following:

EXAMPLE I

| Ingredients | Percent By Weight of Four Primary Ingredients |
|---|---|
| Flour | From about 89 to about 92 |
| Dried Buttermilk | From about 4 to about 5.5 |
| Dried Cream | From about 2 to about 3 |
| Dehydrated Eggs | From about 1.5 to about 2 |

Salt and pepper are added to taste. The dry mixture is made simply by mixing the ingredients since no sifting is necessary. Sufficient liquid, preferably water, is added to form a batter of consistency to adhere to and coat the food to be cooked. In this case, from about 0.4 to about 0.6 pint of water for each five ounces of mixture is combined with the dry ingredients and mixed. Chicken, shrimp, fish and potatoes are then coated with the mixture and then fried in a deep fry. A batter produced using the mixture of this invention is more pliable, forms a better seal, has a better color and is better tasting than those created from other dry mixtures. The batter can even be applied directly to frozen foods, which when subsequently cooked will exhibit the same desirable characteristics. After mixing with water, the batter remains effective for at least 36 hours as shown in Example II.

The flour of Example I is preferably wheat flour and the dried buttermilk and cream are preferably made from cow's milk, but some substitutions will work well. Deep frying is the preferred method of cooking using the batter of this invention, but other methods such as panfrying are within the scope of this invention.

EXAMPLE II

Mix the ingredients listed in Example I and mix the water. Allow the mixture to sit 36 hours at room temperature. Then coat the food items and cook as in Example I. The batter does not become lumpy or fail to adhere to the food items. The food cooked in the batter still exhibits the desirable qualities obtained from cooking in the freshly mixed batter.

It is to be understood that while the proportions of the ingredients suggested in the examples are of particular utility, important advantages inherent in the invention may be obtained by adding other ingredients. As many possible embodiments may be made of the invention without departing from the scope thereof, it is to be understood that all matter herein set forth is to be interpreted as illustrative and not in a limiting sense.

What is claimed is:

1. A dry mix consisting essentially of:

| Ingredients | Percent By Weight of Listed Ingredients |
|---|---|
| At least one farinaceous ingredient | From about 87 to about 95 |
| Dried buttermilk | From about 3 to about 7 |
| Dried cream | From about 1 to about 4 |
| Dehydrated eggs | From about 1 to about 3 |

2. A dry mix according to claim 1 consisting essentially of:

| Ingredients | Percent By Weight of Listed Ingredients |
|---|---|
| At least one farinaceous ingredient | From about 89 to about 94 |
| Dried buttermilk | From about 3 to about 6 |
| Dried cream | From about 1 to about 3 |
| Dehydrated eggs | From about 1 to about 3 |

3. A dry mix according to claim 2 consisting of:

| Ingredients | Percent By Weight of Listed Ingredients |
|---|---|
| Flour | From about 89 to about 92 |
| Dried buttermilk | From about 4 to about 5.5 |
| Dried cream | From about 2 to about 3 |
| Dehydrated eggs | From about 1.5 to about 2 |

4. A method of preparing foods to be cooked using a dry mix consisting essentially of:

| Ingredients | Percent By Weight of Listed Ingredients |
|---|---|
| At least one farinaceous ingredient | From about 87 to about 95 |
| Dried buttermilk | From about 3 to about 7 |
| Dried cream | From about 1 to about 4 |
| Dehydrated eggs | From about 1 to about 3 | comprising, the steps of:
 combining sufficient liquid with said batter mix to form a batter consistency capable of substantially adhering to and coating the foods and;
 coating the foods to be cooked with said batter.

5. A method according to claim 4 wherein combining sufficient liquid comprises combining from about 0.4 pint to about 0.6 pint of water with each five ounces of mix.

6. A method of preparing foods to be cooked using a dry mix consisting essentially of:

| Ingredients | Percent By Weight of Listed Ingredients |
|---|---|
| At least one farinaceous ingredient | From about 89 to about 94 |
| Dried buttermilk | From about 3 to about 6 |
| Dried cream | From about 1 to about 3 |

| Ingredients | Percent By Weight of Listed Ingredients |
| --- | --- |
| Dehydrated eggs | From about 1 to about 3 | comprising, the steps of:
   combining sufficient liquid with said batter mix to form a batter of consistency capable of substantially adhering to and coating the foods; and
   coating the foods to be cooked with said batter.

7. A method according to claim 6 wherein combining sufficient liquid comprises combining from about 0.4 pint to about 0.6 pint of water with each five ounces of mix.

8. A method of preparing foods to be cooked using a dry mix consisting essentially of:

| Ingredients | Percent By Weight of Listed Ingredients |
| --- | --- |
| Flour | From about 89 to about 92 |
| Dried buttermilk | From about 4 to about 5.5 |
| Dried cream | From about 2 to about 3 |
| Dehydrated eggs | From about 1.5 to about 2 | comprising, the steps of:
   combining sufficient liquid with said batter mix to form a batter of consistency adhering to and coating the foods; and
   coating the foods to be cooked with said batter.

9. A method according to claim 8 wherein combining sufficient liquid comprises combining from about 0.4 pint to about 0.6 pint of water with each five ounces of mix.

* * * * *